United States Patent
Huang et al.

(10) Patent No.: US 8,269,844 B2
(45) Date of Patent: Sep. 18, 2012

(54) METHOD OF IMPROVING VIDEO IMAGES BY REMOVING THE EFFECTS OF CAMERA VIBRATION

(75) Inventors: Chien-Min Huang, Clovis, CA (US); Farzin Aghdasi, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 511 days.

(21) Appl. No.: 12/527,619

(22) PCT Filed: Mar. 26, 2008

(86) PCT No.: PCT/US2008/058313
§ 371 (c)(1),
(2), (4) Date: Aug. 18, 2009

(87) PCT Pub. No.: WO2008/118987
PCT Pub. Date: Oct. 2, 2008

(65) Prior Publication Data
US 2010/0214425 A1    Aug. 26, 2010

Related U.S. Application Data

(60) Provisional application No. 60/920,297, filed on Mar. 26, 2007.

(51) Int. Cl.
*H04N 5/228* (2006.01)
*H04N 7/18* (2006.01)
(52) U.S. Cl. ............. 348/208.6; 348/155; 348/208.1; 348/208.4
(58) Field of Classification Search ............ 348/155, 348/208.99, 208.1, 208.4, 208.6
See application file for complete search history.

(56) References Cited

U.S. PATENT DOCUMENTS 6,026,190 A    2/2000    Astle
6,298,144 B1 *  10/2001    Pucker et al. ............ 382/103
(Continued)

FOREIGN PATENT DOCUMENTS
WO    WO2007020569    2/2007

OTHER PUBLICATIONS

Vella, F., Castorina, A., Mancuso, M., Messina, G., Robust Digital Image Stabilization Algorithm Using Block Motion Vectors (2002) ST Microelectronics Advanced System Technology Catania Lab, Digital Still Camera & Multimedia Group, IEEE 0-7803-7300-6/02, pp. 234-235.

*Primary Examiner* — Ngoc-Yen Vu
(74) *Attorney, Agent, or Firm* — Hamilton, Brook, Smith & Reynolds, P.C.

(57) ABSTRACT

A method of improving a video image by removing the effects of camera vibration comprising the steps of, obtaining a reference frame, receiving an incoming frame, determining the frame translation vector for the incoming frame, translating the incoming frame to generate a realigned frame, performing low pass filtering in the spatial domain on pixels in the realigned frame, performing low pass filtering in the spatial domain on pixels in the reference frame, determining the absolute difference between the filtered pixels in the reference frame and the filtered pixels in the realigned frame, performing low pass filtering in the temporal domain on the pixels in the realigned frame to generate the output frame if the absolute difference is less than a predetermined threshold, and providing the realigned frame as the output frame if the absolute difference is greater than the predetermined threshold.

13 Claims, 5 Drawing Sheets

U.S. PATENT DOCUMENTS

| | | |
|---|---|---|
| 6,809,758 B1 | 10/2004 | Jones |
| 6,885,706 B2 * | 4/2005 | Hsu .......................... 375/240.24 |
| 7,050,092 B2 * | 5/2006 | Kondo et al. ............. 348/208.99 |
| 7,333,132 B2 * | 2/2008 | Shimizu et al. ............ 348/208.1 |
| 7,362,374 B2 * | 4/2008 | Holt et al. ..................... 348/446 |
| 7,880,769 B2 * | 2/2011 | Qi ............................ 348/208.99 |
| 8,139,885 B2 * | 3/2012 | Hsu ............................... 382/260 |
| 2005/0135698 A1 * | 6/2005 | Yatsenko et al. ............... 382/260 |
| 2007/0085927 A1 | 4/2007 | Auberger |

* cited by examiner

METHOD OF IMPROVING VIDEO IMAGES BY REMOVING THE EFFECTS OF CAMERA VIBRATION

BACKGROUND OF THE INVENTION

This invention relates generally to surveillance systems and, in particular, to a method of and apparatus for improving the video images from a video camera by removing the effects of camera vibration.

When a camera is mounted on a fixed platform and the camera is zoomed in to a large magnification, very often the images generated by the camera are of poor quality because of the shaking of the camera. The greater the degree of magnification, the more evident the shaking becomes and the more the picture quality degrades. The cause of the shaking is because the platform or object to which the camera is attached is actually shaking even though it may not be obvious to a user looking at the camera installation.

Depending upon the application and the environment, the amount of shaking can be significant and can provide an annoying result in the video generated by the camera. Accordingly there has been a long felt need in the security industry for a method and apparatus to eliminate the shaking artifact and thereby improve the video images from the video camera.

SUMMARY OF THE INVENTION

In accordance with the present invention there is provided a method of improving a video image by removing the effects of camera vibration comprising the steps of, obtaining a reference frame, receiving an incoming frame, determining the frame translation vector for the incoming frame, translating the incoming frame to generate a realigned frame, performing low pass filtering in the spatial domain on pixels in the realigned frame, performing low pass filtering in the spatial domain on pixels in the reference frame, determining the absolute difference between the filtered pixels in the reference frame and the filtered pixels in the realigned frame, performing low pass filtering in the temporal domain on the pixels in the realigned frame to generate the output frame if the absolute difference is less than a predetermined threshold, and providing the realigned frame as the output frame if the absolute difference is greater than the predetermined threshold.

In another aspect of the present invention there is provided an apparatus for improving a video image by removing the effects of camera vibration comprising a memory for storing a plurality of frames containing video images, and a processor connected to the memory and being programmed to obtain a reference frame from the plurality of frames, receive an incoming frame from said memory, determine the frame translation vector for the incoming frame, translate the incoming frame to generate a realigned frame, perform low pass filtering in the spatial domain on pixels in the realigned frame, perform low pass filtering in the spatial domain on pixels in the reference frame, determine the absolute difference between the filtered pixels in the reference frame and the filtered pixels in the realigned frame, perform low pass filtering in the temporal domain on the pixels in the realigned frame to generate an output frame if the absolute difference is less than a predetermined threshold, and providing the realigned frame as the output frame if the absolute difference is greater than the predetermined threshold.

In a further aspect of the invention there is provided a method as described above in which the video image is an interlaced video image having first and second fields and the method further comprises the steps of splitting the reference frame into the first and second fields and splitting the received incoming frame into the first and second fields and wherein the step of determining the frame translation vector comprises determining the translation vector for the first field and for the second field, wherein the step of translating the incoming frame to generate a realigned frame comprises the steps of translating the first field and the second field to generate realigned first and second fields, wherein the step of performing low pass filtering in the spatial domain on pixels in the realigned frame comprises the steps of performing low pass filtering in the spatial domain on pixels in the realigned first and second fields, wherein the step of performing low pass filtering in the spatial domain on pixels in the reference frame comprises performing low pass filtering in the spatial domain on pixels in the first and second fields in the reference frame, wherein the step of determining the absolute difference between the filtered pixels in the reference frame and the filtered pixels in the realigned frame comprises determining the absolute difference between the filtered pixels in the first field in the reference frame and the filtered pixels in the realigned first field and determining the absolute difference between the filtered pixels in the second field in the reference frame and the filtered pixels in the realigned second field and the step of performing low pass filtering in the temporal domain on the pixels in the realigned frame to generate the output frame if the absolute difference is less than a predetermined threshold and providing the realigned frame as the output frame if the absolute difference is greater than the predetermined threshold comprises performing low pass filtering in the temporal domain on the pixels in the realigned first field to generate the output first field if the absolute difference is less than a predetermined threshold, performing low pass filtering in the temporal domain on the pixels in the realigned second field to generate the output second field if the absolute difference is greater than a predetermined threshold and providing the realigned first field and second field as the output frame if the absolute difference is greater than the predetermined threshold.

In a further aspect of the present invention there is provided a computer readable medium comprising instructions that, when executed by a computer, cause the computer to be adapted to perform the method of the present invention.

Other advantages and applications of the present invention will be made apparent by the following detailed description of the preferred embodiment of the invention.

DETAILED DESCRIPTION OF THE INVENTION

Figure 1:
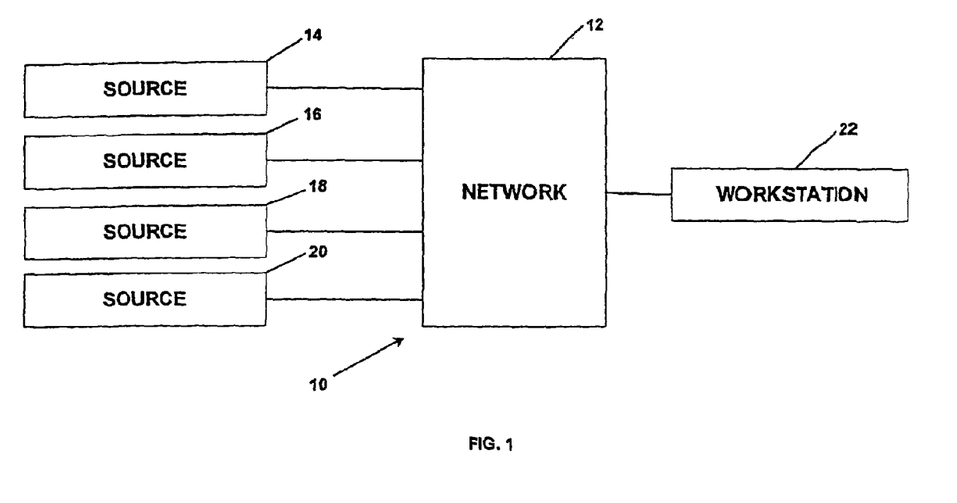
FIG. 1 is a block diagram of a video surveillance system utilizing the present invention.

Referring to FIG. 1, a video surveillance system 10 has a network 12 which can be a closed network, local area network, or wide area network, such as the Internet. A plurality of video sources 14, 16, 18, and 20, which can be, for example, video cameras, digital video recorders or servers, are connected to network 12 to provide real-time video streams, such as MPEG video streams. Workstation 22, which can be, for example, a control point in surveillance system 10, a personal computer or a user logged into surveillance system 10 by means of a laptop computer, is connected to network 12. Sources 14, 16, 18, and 20 provide MPEG video streams to workstation 22 via network 12.

Figure 2:
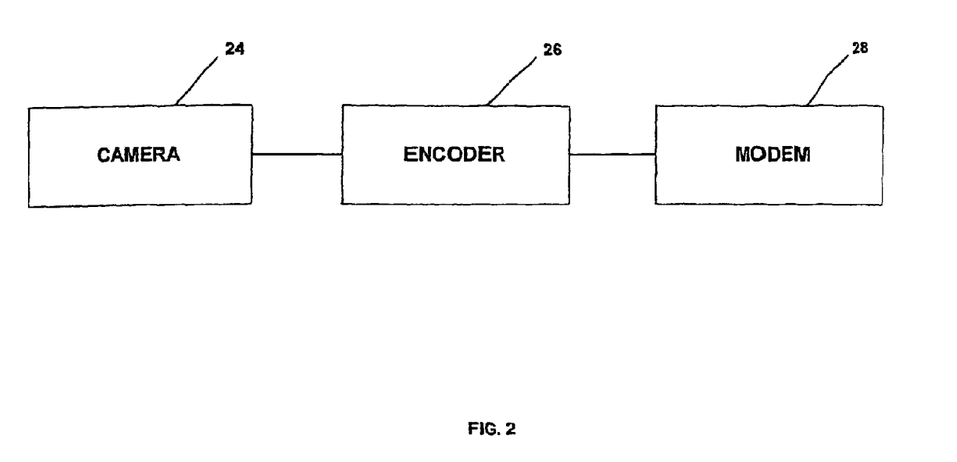
FIG. 2 is a block diagram of an exemplary video source in the video surveillance system shown in FIG. 1.

An exemplary video source is illustrated in FIG. 2 in block diagram form. Camera 24 provides its output to encoder 26, which contains a processor and memory. Encoder 26 provides an MPEG video stream to modem 28 for transmitting to network 12. It is to be understood that although camera 24, encoder 26, and modem 28 have been shown as separate devices, their functions can be provided in a single device or in two devices rather than three separate devices as illustrated.

Figure 3:
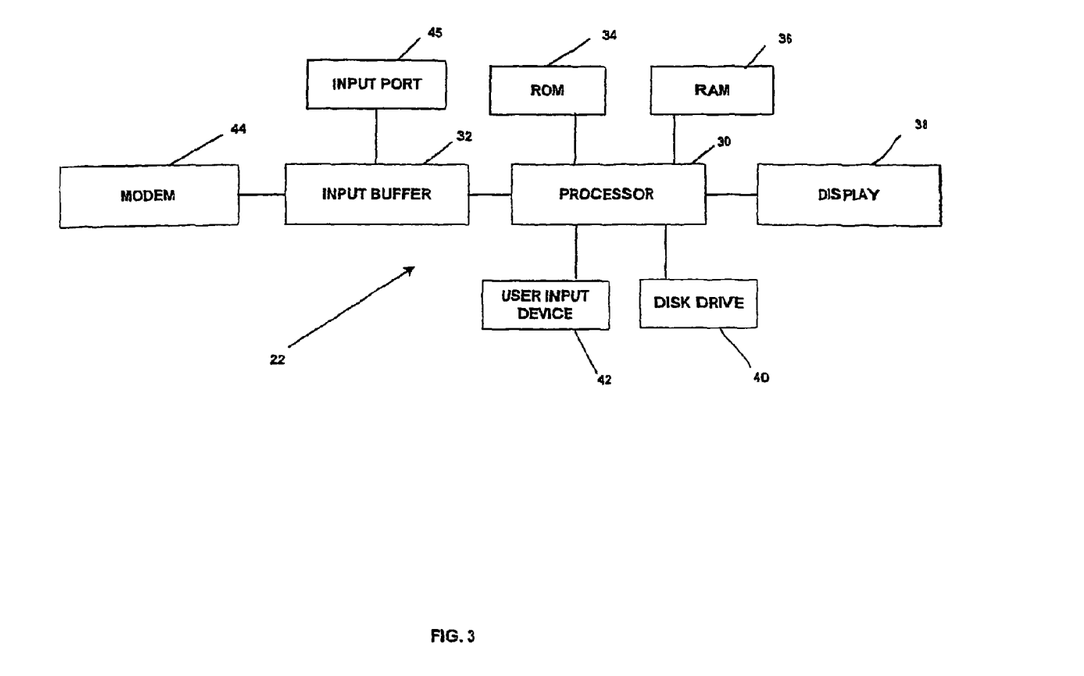
FIG. 3 is a block diagram of an exemplary workstation in the video surveillance system shown in FIG. 1.

With reference to FIG. 3, an exemplary workstation of the present invention is shown in block diagram form. Workstation 22 has a processor 30 which is connected to input buffer 32, ROM 34, RAM 36, display 38, disk drive 40 and user input device 42. Processor 30 can be a central processing unit or a digital signal processor or both. User input device 42 can be a keyboard, mouse, controller, or other suitable input device. Processor 30 implements algorithms and programs that are stored in ROM 34 or disk drive 40 in response to user input from user input device 42 and provides output signals to display 38. Modem 44 is connected to network 12 and receives the MPEG video streams from sources 14, 16, 18, and 20 in FIG. 1. Modem 44 provides the MPEG video streams to input buffer 32. The video stream data can be stored in a partition of disk drive 40 according to the method of the present invention. Input port 45, which can be, for example, a USB or FireWire port, can also provide video streams to input buffer 32. Alternatively, processor 30 can have its own input buffers, or a portion of RAM 36 can be used as an input buffer.

The anti-shaking software module for implementing the present invention can be utilized in numerous locations in video surveillance system 10. For example, the anti-shaking module can be located in one of sources 14, 16, 18, 20, which can be, for example, video cameras, encoders connected to video cameras, digital video recorders or servers. In addition, the anti-shaking module can be stored in the ROM 34, RAM 36, or disk drive 40 of workstation 22. Encoder 26 can store the algorithms in its memory and utilize its processor for analyzing the video images generated by camera 24 to remove the effects of shaking before the images from camera 24 are compressed into a video stream, such as MPEG-4, for transmission on network 12. Obviously, the anti-shaking module can be stored and used in more than one piece of equipment connected to network 12. Each of sources described above comprise a processor and memory and can implement the anti-shaking software module. A single processor or multiple processors operating in parallel and/or not operating in parallel or two or more computers connected together via a network for transmitting or receiving information between the computers can implement the anti-shaking module. The anti-shaking software module can be stored on a computer readable medium, which refers to any storage device used for storing data accessible by a computer. Examples of a computer readable medium include a magnetic hard disk, a floppy disk, an optical disk, such as a CD-ROM or a DVD, a magnetic tape, a memory chip, and a carrier wave used to carry computer readable electronic data, such as those used in transmitting and receiving e-mail or in accessing a network.

First the system must capture a reference frame, which can be a single frame or average of several consecutive frames. The reference frame can be updated periodically to reflect slow scene changes, such as shadows, parked vehicles that have moved into the scene, and so forth. One method is to restart the algorithm and develop a new reference frame periodically. However, it is also possible to redevelop the reference frame continuously and combine a percentage of the most recent frames with the original reference frame. In this way, the reference frame gradually follows the changing scene and updates itself automatically.

The frame translation vector for an incoming frame can be found by using a block-matching or correlation search, algorithm. It is assumed that a block from the reference frame and a search window in the incoming frame are given. The search window of the incoming frame is in the surrounding area of the same coordinate of the reference block in the reference frame. The reference block is compared with each block in the search window to find the block that is most similar to the reference block. The translation vector is the difference between the coordinate of the reference block and that of the best matching block found in the incoming frame. Many different similarity measurements can be used to measure how close the two blocks are. In general, L1 and L2 norm are used and described by the equations as follows:

$$\Min_{(x,y)\in W} D_1(x, y) = \sum_{(i,j)\in B} |u(i, j) - v(x + i, y + j)|$$

$$\Min_{(x,y)\in W} D_2(x, y) = \sum_{(i,j)\in B} [u(i, j) - v(x + i, y + j)]^2$$

where
u(i,j): pixels in the reference block,
v(i,j): pixels in the block of the incoming frame,
W: set of coordinates in the search window,
B: set of pixels in the block,
(x,y): the translation vector.

The algorithm finds the translation vector that has the minimal block difference. This approach is called an exhaustive search. The central area of the reference frame is compared to the central portion of the new frame and the similarly noted from the equation. The new frame is then moved one pixel or less than one pixel (sub-pixel) and the comparison repeated. The new frame is moved again in an expanding spiral search until the closest match is found. This is the amount the new frame moved. Alternatively, the reference block and the search window in the incoming frame can be swapped, that is, the block from the incoming frame can be used to find the most similar block in the reference frame. It should be noted that the same result can be obtained in a spatial frequency domain, if the L2 norm is used.

To find the correct translation vector, a large block should be used. The larger the block is, the smaller the chance of finding a wrong translation is, but the higher the computation required. One way to eliminate the dilemma is to use a decimated block that covers close to the entire image size. For instance, if the entire image size is 240×360, a block of three-fourths of the original in both the horizontal and vertical directions, that is, 180×270 can be used. This is the central area. The block of 180×270 size is decimated by a factor of four in both directions. Then the actual block size used is only 45×67, but represents three quarters of the image area. The anti-shaking algorithm of the present invention adaptively changes the search range to achieve the best performance. The adaptive search range algorithm is described as follows:

```
Let
    x- and y-directional search ranges be [sx0,sx1] and [sy0,sy1],
      respectively;
    x and y be the values of x- and y-directional translation, respectively;
    min_x and max_x be the minimal and maximal translations in
      x-direction, respectively;
    min_y and max_y be the minimal and maximal translations in
      y-direction, respectively.
1. Initially, given [sx0, sx1] and [sy1,sy1];
    let the counter=0 and min_x=max_x=min_y =max_y=0;
2. For each frame process the anti-shaking algorithm,
        min_x = Min(x, min_x);
        max_x = Max(x, max_x);
        min_y = Min(y, min_y);
        max_y = Max(y, max_y);
        counter=counter+1;
        if (counter=N)
        then
            sx0=min_x−1;
            sx1=max_x+1;
            sy0=min_y−1;
            sy1=max_y+1;
            counter=0;
            min_x=max_x=min_y=max_y=0;
```

As described above, some information at the boundary will be lost. Pre-processing can be used to reduce both the search range and the loss of information. Reducing the search range can reduce the computation complexity. The preprocessing is identical to the entire anti-shaking method, but it just records the range of the translation vectors in a short period of time and computes the mean of the translation vectors. A future input frame, that has the translation vector very close to the mean vector, is used to replace the reference frame. The replacement of the reference frame cannot be done too often, otherwise it will generate another shaking artifact.

When the translation vector (x,y) has been found for the incoming image, the frame translation will move each pixel of the incoming frame from coordinate (i,j) to coordinate (i-x,j-y). Let the frame size be N×M pixels, from coordinate (0,0) to coordinate (N-1,M-1). If either x or y are not zero, then there will be x columns and y rows of boundary information be lost. The lost boundary rows and columns can be extended by the nearest row and column, respectively, or they can be padded with zeros. If the realigned frame is used as the output frame, it may have many discontinuities in the temporal domain. These discontinuities are very annoying to human eyes and are caused by two reasons. First, the resolution of the translation vector is limited, due to the practicality of allowed computation capability. For instance, half-pixel resolution is better than that of single-pixel, but increases complexity. Second, the amount of the translation for each pixel in the frame is not necessarily the same, due to image distortions and object movement within the frame which cannot be described by the same vector as the background.

Low pass temporal filtering significantly reduces the artifacts caused by the discontinuities described above. However, if low pass temporal filtering is applied to every pixel in the frame, then it will smear the frames when there are moving objects in the scene. In order to reduce the problem, the realigned frame is compared with the reference frame pixel by pixel. If the difference is over a predetermined threshold, then no low pass filtering is applied to the pixel. The adaptive temporal low pass filter can be described mathematically as follows:

1. Do low pass filtering in spatial domain on u(i,j), the reference frame, to obtain p(i,j),
2. Do low pass filtering in spatial domain on s(i,j), the realigned frame, to obtain q(i,j),
3. If $|p(i,j)-q(i,j)| > \epsilon$ (threshold), then do not low pass filter s(i,j) in the temporal domain and directly update u(i,j) by s(i,j);
4. If $|p(i,j)-q(i,j)| < \epsilon$ (threshold), then low pass filter s(i,j) in the temporal domain and update u(i,j) by the filtered pixel value.

As discussed above, that the amount of the translation for each pixel in the same frame is not identical. Temporal low pass filtering can reduce the artifact caused by the different translations, but it will also remove some high frequency components. Another approach is to use a pixel-based translation search algorithm. In this algorithm, the translation for each pixel is found by using the same block-matching algorithm. However, this approach requires significant CPU power and may be too complex for simple applications. Let v(i,j) be the pixel of the input frame and u(i,j) be the pixel of the reference frame.

1. For every u(i,j) in the reference frame, take a block of (2n+1)×(2m+1) pixels from the reference frame centered at coordinate (i, j), and do a block-matching search in the input frame to find the translation vector.
2. Compute the average of pixel translation vectors found in step 1.
3. For a pixel at coordinate (i,j), compute the distance of its pixel translation vector to the average translation vector. If it is over the threshold,
    then replace the reference pixel u(i,j) with the incoming pixel v(i,j);
    otherwise
        a. low pass filter the translation vector in spatial domain
        b. use the filtered vector to get the pixel from the input frame, then do low pass filter to the pixel in temporal domain
        c. use the filtered pixel to replace the reference pixel.

A weighting function can be used in the block-matching algorithm. The weighting value depends on the position of the pixel in the block. The nearer the pixel is to the center, the higher the weighting function applied. Both the reference and the input frames are extended by padding with the nearest pixel values. Both the left and right boundaries are extended by n columns, and both the upper and bottom boundaries are extended by m rows.

It was found that when using the anti-shaking algorithm the video may appear jerky when the camera is moved slowly. The reasons causing the jerkiness can be explained as follows. In the very beginning of the camera movement, the antshaking algorithm can find a good match. The input frames will be re-aligned such that the video looks still. When the movement range is over the search range and the algorithm cannot find a good match, it will refresh the reference frame with the new input frame. The video will be suddenly translated a distance. The algorithm will find a good match after the refresh of the reference frame and the video will be still again. When the movement is over the search distance, a sudden jump happens again. This phenomenon will repeat such that the video looks jerky and annoying. One solution is to link the camera movement with the anti-shaking algorithm. When the camera is moving, it can turn off the anti-shaking process.

A second approach is to use an integrator to integrate the motion translation of the last certain period of time. When the camera is moving constantly in a certain direction, the magnitude of the integrator output will be close to a constant value and the value depends on the speed of the movement. The higher the speed is, the greater the magnitude is. When the camera is still, the camera movement generated out of the shaking will be in a certain range, that is, from a constant negative position to a constant positive position. Thus, the magnitude will be close to zero. Therefore the movement generated out of shaking and actual camera moving can be distinguished.

When the integrator is turned on and the camera is still, the video may appear to jump once a while. Because the reference frame is not always located at the center of the shaking range and the shaking is periodic, the output magnitude of the integrator will be built up. The worst case is when the dominant shaking frequency is close to a multiple of frame (or field) frequency. This problem can be eliminated by increasing the threshold, reducing the integration period, gradually moving the reference frame to the center of the shaking range, or turning off the integrator.

Figure 4:
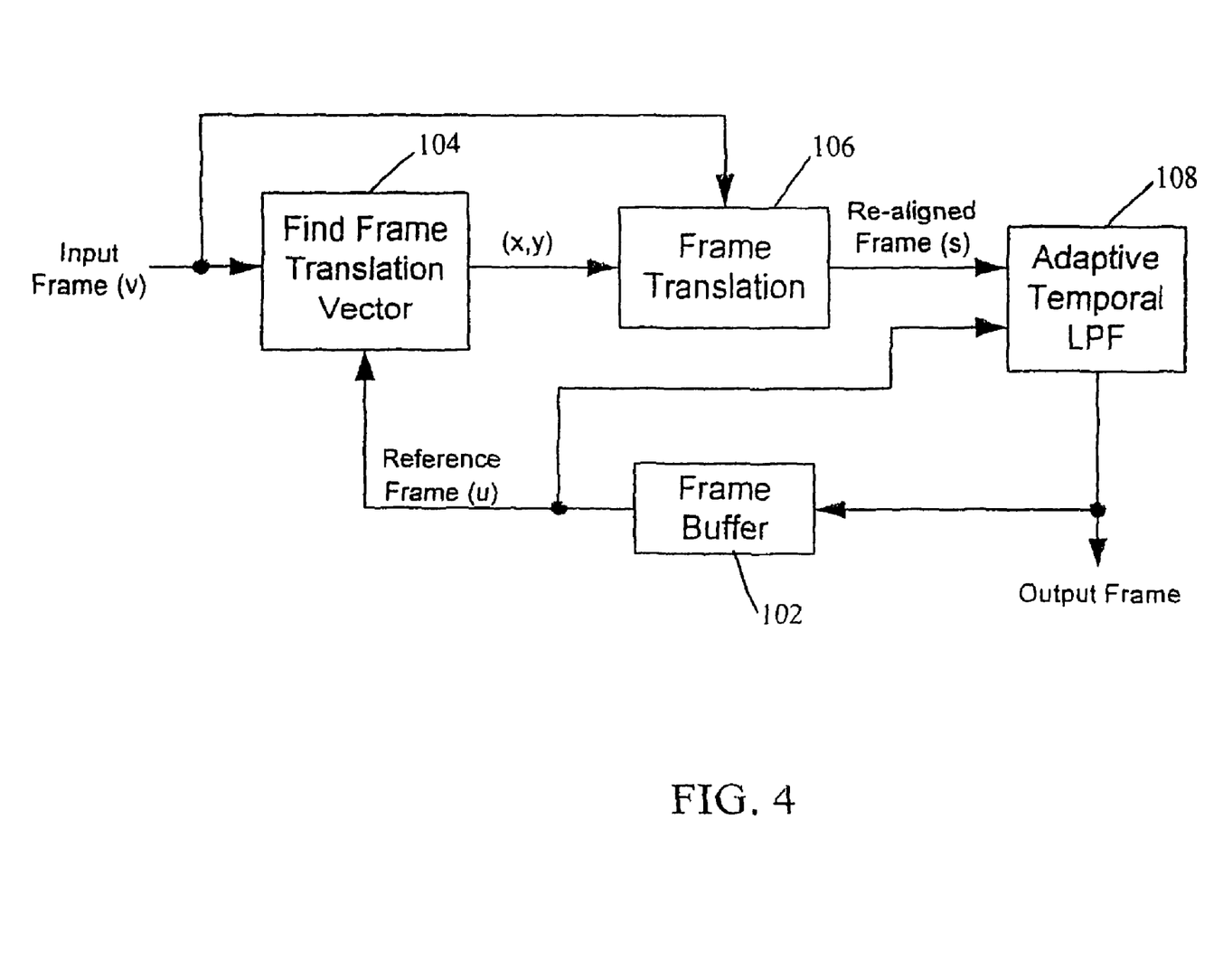
FIG. 4 is a block diagram showing the logic flow of one embodiment of the present invention.

FIG. 4 is a block diagram showing the logic flow of one embodiment of the present invention using the adaptive temporal low pass filtering technique. A reference frame is obtained as discussed above and stored in frame buffer 102. An input frame, i.e., the incoming frame to be analyzed, is provided to block 104 along with the reference frame from frame buffer 102. At block 104, the frame translation vector is determined by, for example, block-matching and is provided to block 106 where the frame translation of the input frame is performed. The realigned frame is provided to block 108 along with the reference frame from frame buffer 102 and the adaptive temporal low pass filtering method of the present method is performed as described above to generate the appropriate output frame with the vibration effects removed and to update the frame buffer as described above.

The anti-shaking method of the present invention applied to progressive video in FIG. 4 can also be applied to interlaced video. Video surveillance systems generally use the interlacing method of displaying images to save the video bandwidth and still provide a smooth picture. In interlaced displays, the display alternates between drawing the even field, which consists of the even-numbered lines, and the odd field, which consists of the odd-numbered lines, of each frame. An interlaced frame consists of an even and odd field and refers to one of the still images, which make up the moving video. Similarly, the surveillance cameras used in these interlaced systems capture only half of the lines from each frame, i.e., one field at a time. The pairs of fields of each frame are perceived at the same time giving the appearance of a complete frame because of persistence of vision. Each interlaced video frame has two fields, and each field is captured at different times. In the situation of an unstabilized camera, the two fields captured in a frame will have different translations. Therefore, each field needs to be processed separately. However, the translation vectors found for each field may not be the best due to the fast searching algorithm. Because of this reason, it will result in a mismatch between the two fields and the mismatch will deteriorate the video. The simplest solution is to drop one field, but that will reduce the video resolution to an unacceptable level. The method of the present invention interpolates the reference for field 2 from field 1 as field 2 is conceptually the lines between each pair of lines in field 1. Two interpolations algorithms for implementing the present invention are presented as follows:

Field Interpolation Algorithm 1:

```
For row i, i = 1 to H/2−1
    For pixel j at row i, j=1 to W
        f2[i][j] = (f1[i][j] + f1[i+1][j]) / 2;
``` where H and W are the height and width of the frame, respectively; f1 is the pixel of field 1 and f2 is the interpolated pixel for field 2.

Field Interpolation Algorithm 2:

```
For row i, i = 1 to H/2−1
    For pixel j at row i, j=2 to W−1
        f2[i][j] =Median(f1[i][j−1], f1[i][j], f1[i][j+1],
                f1[i+1][j−1], f1[i+1][j], f1[i+1][j+1]);
``` where Median is to find two medians out of the six pixel values, then use the average of the two medians as the interpolated value. Algorithm 2 is very time-consuming, a simplified approach is listed as follows:

```
dif = |f1[i][j] − f1[i+1][j]|
if (dif<20)
    f2[i][j] = (f1[i][j] + f1[i+1][j]) / 2;
else
    f2[i][j] =Median(f1[i][j−1], f1[i][j], f1[i][j+1],
            f1[i+1][j−1], f1[i+1][j], f1[i+1][j+1]);
```

However, because most neighboring pixels are very similar, the average can be used as the interpolated, thus the computation complexity is reduced significantly. For example, the line average of line 1 and line 3 from field 1 can be used to get the interpolated value for line 2 of field 2, and the line average of line 3 and line 5 from field 1 can be used to get the interpolated value for line 4 of field 2.

Figure 5:
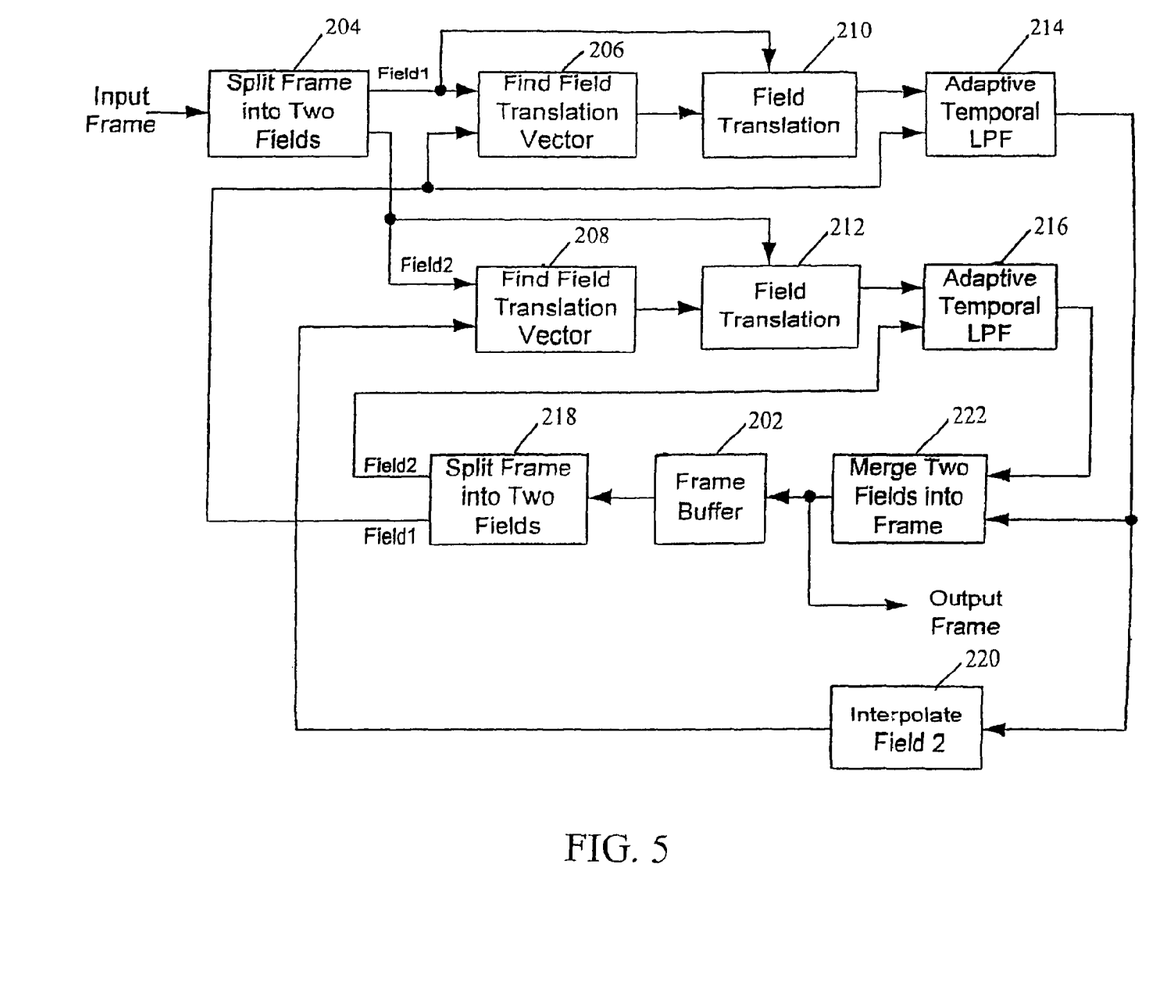
FIG. 5 is a block diagram showing the logic flow of one embodiment of the present invention for interlaced video.

FIG. 5 is a block diagram showing the logic flow of one embodiment of the present invention for use in an interlaced video system. A reference frame is obtained as discussed above and stored in frame buffer 202. The reference frame from frame buffer 202 is split into two fields, for Field1 and Field 2 at block 218. An input frame, i.e., the incoming interlaced video frame to be analyzed, is provided to block 204 where the frame is split into two fields, namely, Field1 and Field2. Field1 is provided to block 206 along with the Field1 reference from block 218. At block 206, the field translation vector for Field1 is determined employing the same techniques as discussed previously in relation to an entire frame of progressive video. Field 1 from the input frame and the field translation vector for Field1 are provided to block 210 where the Field1 translation is performed. Translated Field1 along with the reference Field 1 are provided to block 214 where the adaptive temporal low pass filtering technique is performed as described above. The output from block 214 is provided to block 222 for updating the reference frame stored in frame buffer 202 and also to block 220 where the interpolated value for Field2 is calculated from Field1 as discussed above. The interpolated value for Field2 and Field2 from frame 204 are provided to block 208 for determination of the field translation vector for Field2. The field translation vector from block 208 and Field2 from block 204 are provided to block 212 to generate the realigned Field2. Realigned Field2 is provided to block 216 along with the interpolated value for Field2 and the adaptive temporal low pass filtering of the present invention is performed. The output from block 216 is provided to block 222 where it is merged with the output from block 214 to generate the output interlaced frame containing Field1 and Field with the vibration effects removed. The output of block 222 is also provided to frame buffer 202 for updating the reference frame.

An alternate way of developing a Gaussian mixture model reference is to create a pixel array with three or more blocks of memory per pixel each block containing a candidate monogram video level for that pixel and a counter indicating the number of times the video for that pixel occurred within a defined variance range of the currently stored level.

Each time a new frame is presented for processing each pixel is examined to see if it is within the variance range of the previous averaged pixel. If yes, the counter is incremented positively and the pixel value is averaged with the previously averaged pixel values. If the pixel value is different (outside the variance range), then his new value is placed in the second memory for that pixel and it's counter incremented by one.

On the next frame, the video either matches the first or second averaged video in memory within the allowed variances and the new video is averaged with the previous and its counter is incremented. If the video does not match either of the first or second stored values within their allowed variance range it is then placed in a third memory for that given pixel and it's counter is incremented.

If a pixel contains a video amplitude value, different from the previous three memory locations, then the location with the lowest count is replaced by the new video value and the counter reset to one. The end result is an array of pixels with three choices for each one. The background frame becomes a combination of all of the individual pixels with the highest memory counts.

The advantage of this approach is that pixels significantly different from the candidate backgrounds are thrown away or placed in the third bin and not included in the ongoing averaging process.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of improving a video image by removing the effects of camera vibration comprising the steps of: obtaining a reference frame; receiving an incoming frame; determining the frame translation vector for the incoming frame; translating the incoming frame to generate a realigned frame; performing low pass filtering in the spatial domain on pixels in the realigned frame; performing low pass filtering in the spatial domain on pixels in the reference frame; determining the absolute difference between the filtered pixels in the reference frame and the filtered pixels in the realigned frame; performing low pass filtering in the temporal domain on the pixels in the realigned frame to generate the output frame if the absolute difference is less than a predetermined threshold; and providing the realigned frame as the output frame if the absolute difference is greater than the predetermined threshold.

2. A method as recited in claim 1 further comprising the step of updating the pixels in the reference frame by calculating the average pixel value from the sum of the reference pixel value and the value of the pixel from the realigned frame after low pass filtering in the temporal domain if the absolute difference is less than the predetermined threshold.

3. A method as recited in claim 2 further comprising the step of updating the pixels in the reference frame with the pixels in the realigned frame if the absolute difference is greater than the predetermined threshold.

4. A method as recited in claim 1 further comprising the step of updating the pixels in the reference frame with the pixels in the realigned frame if the absolute difference is greater than the predetermined threshold.

5. A method as recited in claim 1 wherein said video image is an interlaced video image having first and second fields and said method further comprises the steps of splitting the reference frame into the first and second fields and splitting the received incoming frame into the first and second fields and wherein said step of determining the frame translation vector comprises determining the translation vector for the first field and for the second field, wherein said step of translating the incoming frame to generate a realigned frame comprises the steps of translating the first field and the second field to generate realigned first and second fields, wherein said step of performing low pass filtering in the spatial domain on pixels in the realigned frame comprises the steps of performing low pass filtering in the spatial domain on pixels in the realigned first and second fields, wherein said step of performing low pass filtering in the spatial domain on pixels in the reference frame comprises performing low pass filtering in the spatial domain on pixels in the first and second fields in the reference frame, wherein said step of determining the absolute difference between the filtered pixels in the reference frame and the filtered pixels in the realigned frame comprises determining the absolute difference between the filtered pixels in the first field in the reference frame and the filtered pixels in the realigned first field and determining the absolute difference between the filtered pixels in the second field in the reference frame and the filtered pixels in the realigned second field and said step of performing low pass filtering in the temporal domain on the pixels in the realigned frame to generate the output frame if the absolute difference is less than a predetermined threshold and providing the realigned frame as the output frame if the absolute difference is greater than the predetermined threshold comprises performing low pass filtering in the temporal domain on the pixels in the realigned first field to generate the output first field if the absolute difference is less than a predetermined threshold, performing low pass filtering in the temporal domain on the pixels in the realigned second field to generate the output second field if the absolute difference is greater than a predetermined threshold and providing the realigned first field and second field as the output frame if the absolute difference is greater than the predetermined threshold.

6. A method as recited in claim 5 wherein said step of determining the translation vector for the second field comprises determining a reference field for the second field by interpolating the first field.

7. An apparatus for improving a video image by removing the effects of camera vibration comprising: a memory for storing a plurality of frames containing video images; and a processor connected to said memory and being programmed to obtain a reference frame from said plurality of frames, receive an incoming frame from said memory, determine the frame translation vector for the incoming frame, translate the incoming frame to generate a realigned frame, perform low pass filtering in the spatial domain on pixels in the realigned frame, perform low pass filtering in the spatial domain on pixels in the reference frame, determine the absolute difference between the filtered pixels in the reference frame and the filtered pixels in the realigned frame, perform low pass filtering in the temporal domain on the pixels in the realigned frame to generate an output frame if the absolute difference is less than a predetermined threshold, and providing the realigned frame as the output frame if the absolute difference is greater than the predetermined threshold.

8. A apparatus as recited in claim 7 wherein said processor is further programmed to update the pixels in the reference frame by calculating the average pixel value from the sum of the reference pixel value and the value of the pixel from the realigned frame after low pass filtering in the temporal domain if the absolute difference is less than the predetermined threshold.

9. A apparatus as recited in claim 8 wherein said processor is further programmed to update the pixels in the reference frame with the pixels in the realigned frame if the absolute difference is greater than the predetermined threshold.

10. A apparatus as recited in claim 7 wherein said processor is further programmed to update the pixels in the reference frame with the pixels in the realigned frame if the absolute difference is greater than the predetermined threshold.

11. A computer readable medium comprising instructions that, when executed by a computer, cause the computer to be adapted to perform the method of claim 1.

12. A computer readable medium as recited in claim 11 further comprising instructs that, when executed by a computer, cause the computer to be adapted to update the pixels in the reference frame by calculating the average pixel value from the sum of the reference pixel value and the value of the pixel from the realigned frame after low pass filtering in the temporal domain if the absolute difference is less than the predetermined threshold.

13. A computer readable medium as recited in claim 11 further comprising the step of updating the pixels in the reference frame with the pixels in the realigned frame if the absolute difference is greater than the predetermined threshold.

* * * * *